March 12, 1940.　　J. F. KOHLER　　2,192,918
MACHINE FOR MAKING PIES
Filed Feb. 2, 1935　　3 Sheets-Sheet 1
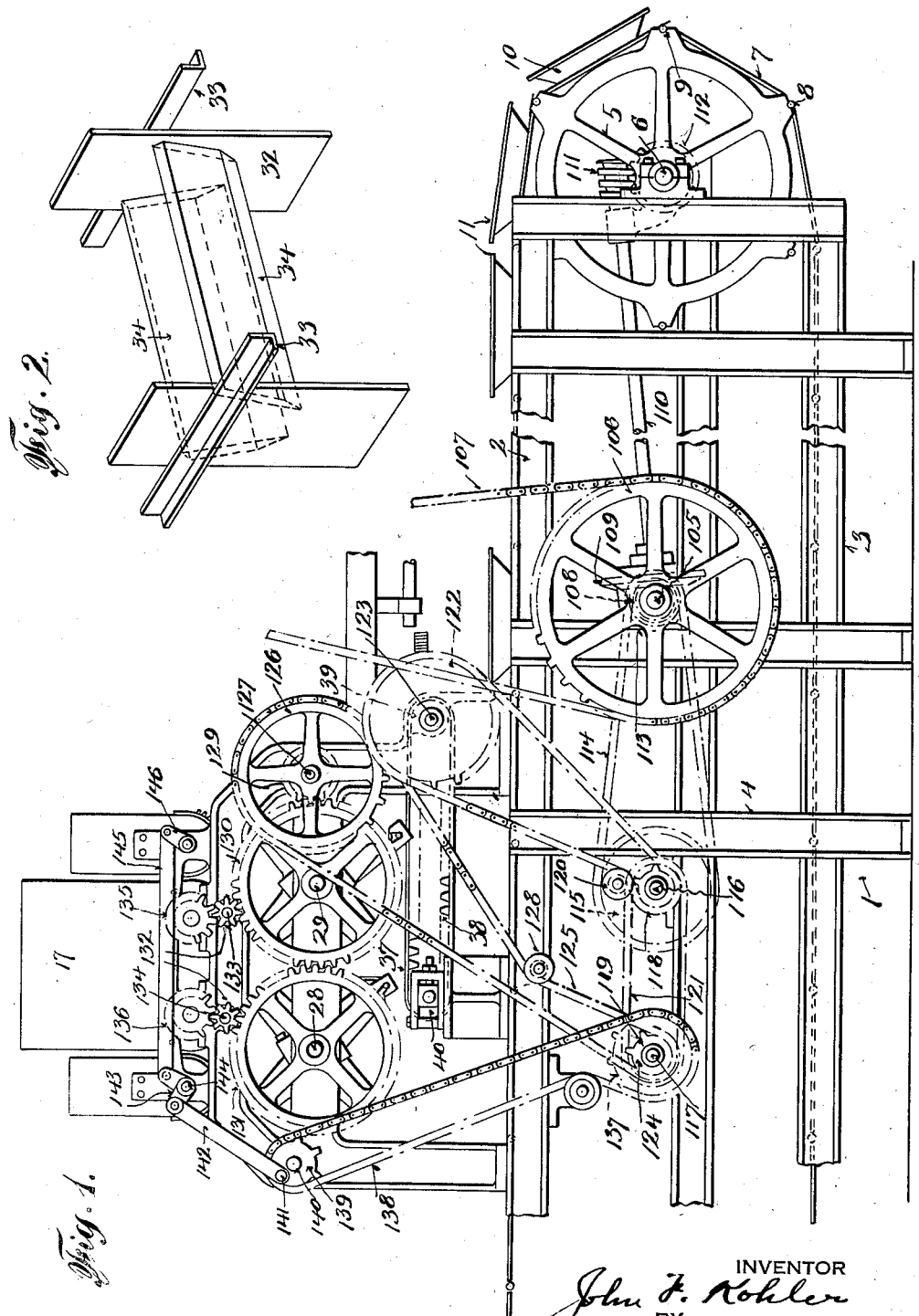
INVENTOR
John F. Kohler
BY
Charles G. Hensley
ATTORNEY March 12, 1940.   J. F. KOHLER   2,192,918
MACHINE FOR MAKING PIES
Filed Feb. 2, 1935   3 Sheets-Sheet 2
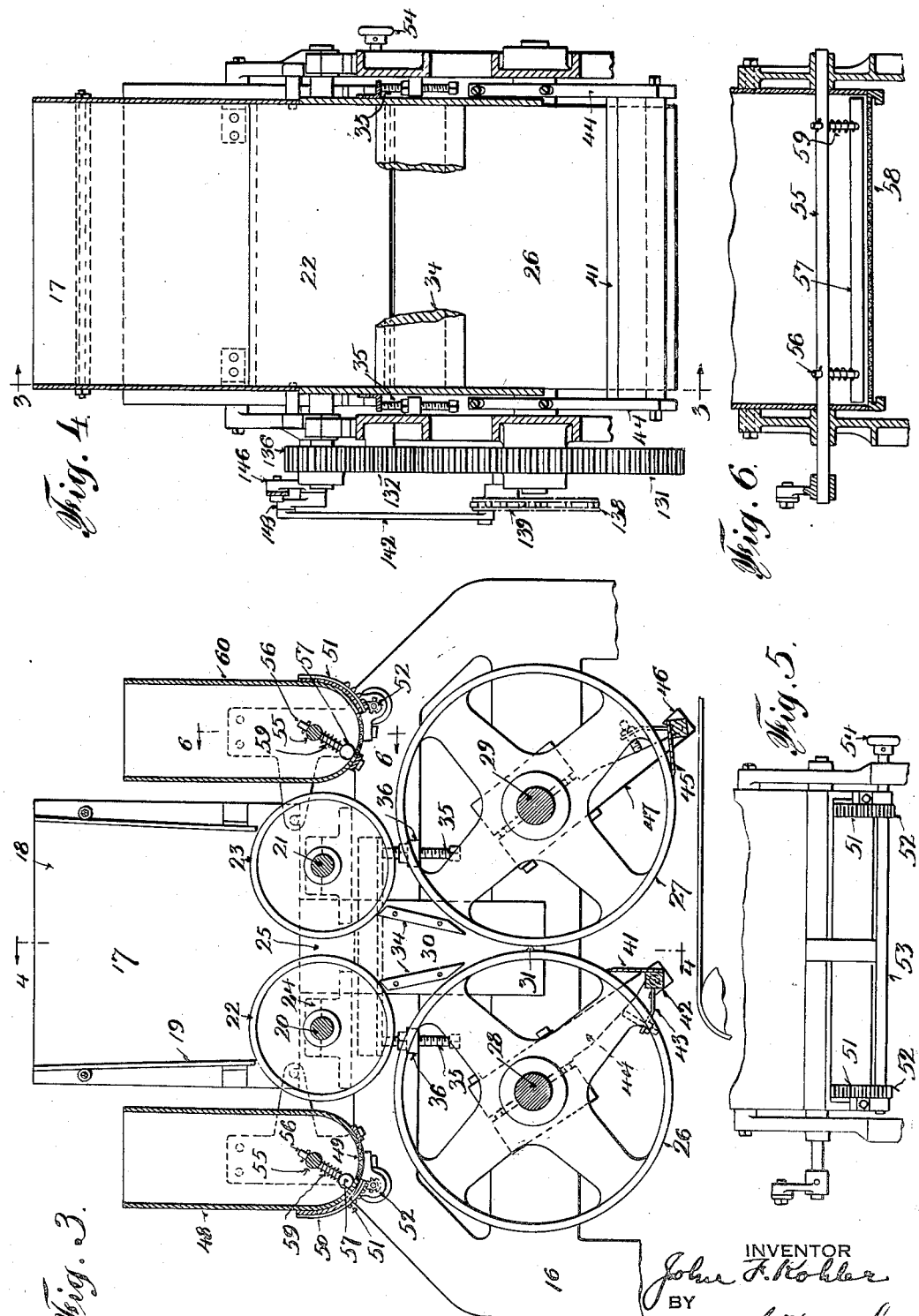

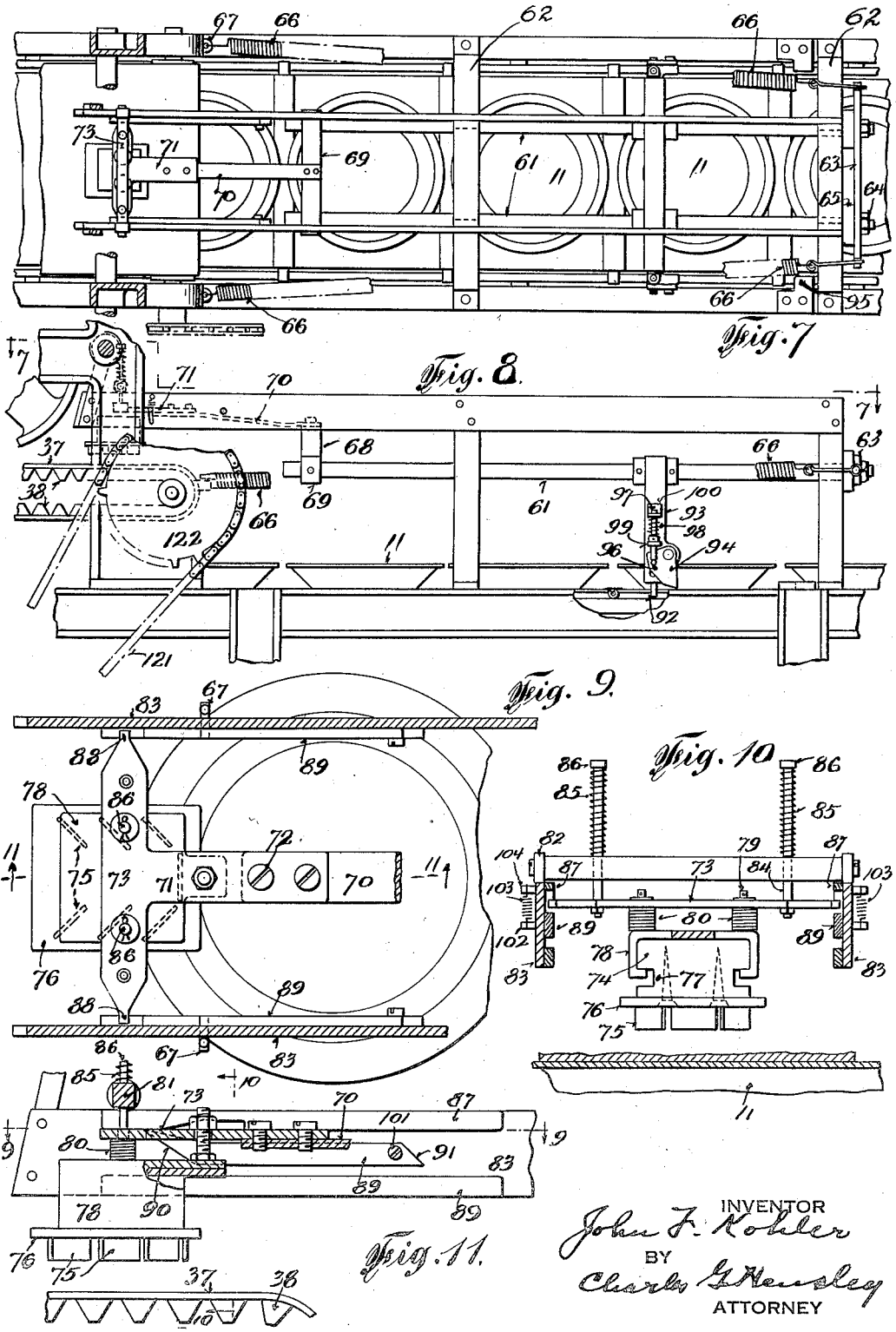

Patented Mar. 12, 1940

2,192,918

UNITED STATES PATENT OFFICE 2,192,918

MACHINE FOR MAKING PIES

John F. Kohler, New York, N. Y.

Application February 2, 1935, Serial No. 4,598

18 Claims. (Cl. 107—1)

The object of the present invention is to provide a machine for making pies with the exception of the application of the filler to the pies. The machine employs a conveyor which may be of circular shape, but it is shown in the drawings as a straightaway conveyor having holders for holding pie plates close to each other in a row and if desired the device shown and described in my copending application Serial No. 673,707 filed May 31, 1933 and which matured May 7, 1935, into Patent No. 2,000,761, may be employed to feed the metal pie plates successively upon the holders of the conveyor automatically to eliminate the requirement for hand feeding the plates to the holders.

The present invention includes means for rolling pie crust dough into the form of a continuous ribbon or strip of suitable width to cover the pie plates and at a speed to correspond with the continuous travel of the pie plates on the holders of the conveyor. One such device is employed adjacent one end of the machine to supply the first layer of dough which is to form the bottom crusts of the pies. Following this dough rolling device the filling material for the pies will be ladled by hand onto the plates after the first or lower crust dough has been applied, and following this a second dough rolling device rolls a body of dough into a continuous strip or ribbon which is automatically fed upon the pie plates to which the lower dough and the filler have been previously applied, in cases where the machine is used to make covered pies.

There is a device for automatically stamping a letter or other indicating means upon the top surface of the strip of dough which is to form the top crust, while this strip of dough is travelling on a short belt and preparatory to its application to the tops of the material on the pie plates; and this device is so timed in relation to the other parts of the machine that the marking will appear regularly on the same position on each pie, for instance, at the center of the pie. This marking device is one of the features of my present invention.

Another object of the invention is to provide means for dusting flour upon the impression rollers which roll the dough in the form of a ribbon, in such manner that the flour will not come into contact with the dough until the latter reaches a position adjacent the bight of the cooperating pressing rollers. The dusting device is made adjustable so that more dusting flour may be applied to one surface of the ribbon of dough than to the other, in order that the dough will feed in the correct direction from the pressing rollers.

Another object of my invention is to provide means for operating the several devices described above in synchronism with each other. Other objects and advantages will be set forth in the following detailed description of my invention.

In the drawings forming part of this application,

Figure 1 is a side elevation of a portion of the machine embodying my invention, Figure 2 is a perspective view of a device forming a compression chamber between the upper and lower dough rollers, Figure 3 is a sectional view taken on the line 3—3 of Figure 4, looking in the direction of the arrows, Figure 4 is a sectional view taken on the line 4—4 of Figure 3, looking in the direction of the arrows, Figure 5 is a detailed view showing the means for adjusting the dusting device to regulate the amount of flour dusted on the lower dough rollers, Figure 6 is a sectional view taken on the line 6—6 of Figure 3 and showing the dusting device, Figure 7 is a sectional view taken on the line 7—7 of Figure 8 and showing the conveyor and marking device in elevation.

Figure 8 is a side elevation of a portion of the machine at the marking device, in which view a portion of the frame is broken away to show parts behind it, Figure 9 is a sectional view taken on the line 9—9 of Figure 11, and shows parts of the marking device, Figure 10 is a sectional view taken on the line 10—10 of Figure 11 and also shows the marking device, and Figure 11 is a sectional view taken on the line 11—11 of Figure 9 and also shows the marking device.

In the drawings I have shown the various working parts of the machine mounted upon a frame 1 which I have shown formed of the longitudinal beams 2, 3 connected together and supported from the floor by the uprights 4 arranged at intervals along the machine. I have shown but one dough rolling device and it is to be understood that where covered pies are to be made an exact duplicate of the dough rolling device shown in Figure 1 may be arranged to the left of this device in Figure 1, so that both devices may roll a strip or ribbon of dough to be fed upon the pie plates, one in advance of the other.

The workmen supplying the fillers to the pies will operate between the first and second dough rolling devices so as to supply the fillers upon the pie plates after the first strip of dough has been applied, so that when the pie plates reach the dough rolling device shown in Figure 1, each plate will have a lower crust dough placed upon it, together with a filler, and this dough rolling device will apply the second dough which is to form the top crust of the pie.

As the ribbon of dough for the top crust is delivered from the rolling device, the marking device acts on the dough while it is travelling on a short belt, so that the marked ribbon of dough feeds onto the pie plates which are travelling on the conveyor.

Preferably, a device for trimming the dough around the edges of the plates will be applied to the machine to act after the second and top dough has been applied to the plates. Trimming devices of this character are well known in the art and such a device may be applied to the present machine. I have not shown the same in the drawings as those familiar with the art will readily understand the application of such a device to the present machine.

In the right hand end of the machine as shown in Figure 1, there is a sprocket wheel 5 mounted upon a cross shaft 6 and a conveyor consisting of rather long links 7 having pintles 8 at their joints, engages around the sprocket wheel with the pintles resting in circular sockets 9 on the teeth of the sprocket wheel. There are mounted on this conveyor holders 10 adapted to receive therein the individual pie plates 11 which may be fed to the holders by the device shown in my said co-pending application Serial No. 673,707.

It will be understood that at the left hand end of the machine there will be another sprocket similar to the sprocket 5 so that the conveyor, which is endless, travels around the spockets in an endless path. The pies are made in the plates while they are on the upper run of this conveyor and they discharge from the conveyor on any suitable support where the conveyor is travelling around the sprockets 5 or, if desired, the machine may be mounted in front of a baking oven (not shown) so that the pies will deliver from the conveyor directly onto the travelling platform of the oven.

There is mounted upon the frame of the machine a pair of upwardly extending standards 16 on which the various parts of the dough rolling device are supported and operated. On the upper portion of this structure there is mounted a hopper 17 having end walls 18 and front and rear walls 19; and into this hopper is placed a large body or supply of dough in condition ready to be formed into a ribbon or strip. On the shafts 20, 21 arranged parallel to each other and crosswise of the machine I have mounted primary dough rollers 22, 23, the shafts being mounted in journal boxes 24 which are adjustable upon the frame of the machine to vary the distance between the peripheries of the rollers 22, 23 according to changes in thickness of the ribbon of dough which is to be formed.

The upper portions of the rollers 22, 23 form the bottom of the hopper and for this purpose the rollers are adjacent to the lower edges of the walls 19 of the hopper, whereas the end walls 18 lie close to or against the ends of the rollers so that the dough is taken from the hopper by rollers and is caused to pass through the bight 25 of the two rollers. These rollers are preferably adjusted so that the spacing at the bight is greater than the thickness of the ultimate strip or ribbon of dough.

Below the primary rollers just described I have mounted the rollers 26, 27 upon the shafts 28, 29 which are journaled in the standards 16. These rollers are shown as of larger diameter than the primary rollers 22, 23, preferably a multiple thereof or say, the diameters may be twice the diameter of the rollers 22, 23. These lower rollers act on the dough after it has been propelled by the upper rollers 22, 23 into the compression chamber 30. The rollers 26, 27 are spaced apart at the bight 31 a distance corresponding with the thickness of the final sheet or ribbon of dough and the rollers are adjustable to vary this thickness.

Usually, the rollers on the device for rolling the lower crust dough are arranged farther apart than the rollers for rolling the top crust dough.

I have provided means for confining the dough while in the chamber 30 to prevent it from spreading laterally out of the chamber in order that it will move from the upper rollers 22, 23 to the lower rollers 26, 27. As shown in Figure 2 this device consists of end plates 32 suitably supported on angle bars 33 forming part of the frame of the machine; and of two diagonally disposed plates 34 extending crosswise of the machine.

These two latter plates at their upper edges are chamfered or slanted and these edges lie close to or touch the peripheries of the two upper rollers 22, 23 so that the dough propelled downwardly by these rollers will leave the latter and pass entirely into the compression chamber 30. The lower edges of these same plates are shown as beveled or chamfered and these edges lie close to the peripheries on the two lower rollers but do not contact therewith in order that they will not rub off or push back the flour which is dusted onto the lower rollers in the manner hereinafter described.

The vertical plates 32 of the compression chamber lie close to or in contact with the upper rollers 22, 23 and the lower rollers 26, 27 at their ends in order to prevent the dough from spreading laterally out of the compression chamber.

The parts shown in Figure 2 forming the compression chamber are adapted to be adjusted vertically by means of the supporting bolts 35 which are threaded through ears 36 formed on the frame of the machine, so that the plates 34 may be slightly raised or lowered according to any variation in the adjustment of the positions of both the upper rollers and the lower rollers.

There is a short endless belt 37 provided with bars or cross slats 38 which travels around the two pulleys 39, 40 and the upper run of this belt lies rather close to and below the rollers 26, 27 so that the ribbon of dough passing through the bight of these two rollers is deposited in a continuous strip on the top run of the belt and it is while the strip or ribbon of dough is travelling on this belt that the marking device acts on the strip to mark it for each pie, in a manner to be hereinafter described. I have shown a scraping knife 41 mounted upon the bar 42 so that the edge of the knife scrapes the surface of the roller 26 to prevent the ribbon of dough from following this roller beyond the position of the knife.

The bar on which this knife is carried is pressed by a spring 43 to hold the edge of the knife against the periphery of the roller 26 and the knife device is mounted on an arm 44 which supports it in proper relation to the roller. The arm 44 as is customary, is adjustable around the axis of the shaft 28 to permit the knife to be placed in the most advantageous position in relation to the roller. A similar scraping knife 45 is arranged to co-operate with the periphery of the roller 27 and it is mounted similar to the knife 41 upon the bar 46 carried by the arm 47 mounted to be adjustable around the axis of the shaft 29.

This second knife is preferably disposed a much greater distance from the bight of the two rollers 26, 27 so that the ribbon of dough will have a tendency to follow the surface of the roller 27 until it is detached by the scraper 45 at a point over the travelling belt 37; in other words, as the ribbon of dough passes through the bight of the two rollers 26, 27 it will follow only the roller 27 until it is in the proper position to discharge downwardly on the upper run of the belt 37.

I provide means for dusting flour upon the peripheries of both of the rollers 26, 27 in such manner that the flour dusted upon these rollers will not come into contact with the dough until the latter is about to pass through the bight 31 of the two rollers 26, 27. At the left in Figure 3 there is shown a container 48 for holding a supply of flour for dusting purposes. The lower portion or bottom of this container is shown as of arcuate shape and this portion is provided with a number of apertures 49 extending across the same and through which flour is adapted to be discharged upon the periphery of the roller 26.

There is a shutter 50 of arcuate shape adapted to be moved in an arcuate path for the purpose of closing more or less of the apertures 49. This shutter is provided with arcuate gear segments 51 which are acted upon by pinions 52, the latter being mounted upon the shaft 53 which is provided with an operating handle or knob 54, whereby the turning of the knob by hand will rotate the pinions 52 and these acting on the arcuate gear sectors 51 will cause the shutter to be moved clockwise or counterclockwise in relation to the curved bottom wall of the container, so that the shutter may be caused to cover up any portion of the apertures 49 and thereby regulate the amount of flour which will feed from this container onto the roller 26.

Obviously, when all of the apertures 49 are uncovered by the shutter 50, more flour per minute will be discharged from the container onto the roller and conversely, the fewer the number of apertures which are uncovered by the shutter, the less flour will be dusted onto the roller.

The operator, when he turns the knob 54 right or left to adjust the position of the shutter, will thereby control the quantity of flour dusted on the roller 26.

There is a shaft 55 extending through the end walls of the receptacle 48 which shaft is adapted to be rocked in the manner hereinafter described. Extending through this shaft are short rods 56 and there is connected to the lower ends of these rods a longitudinally extending bar 57 which is pressed against the curved surface of the bottom 58 of the receptacle by the springs 59 surrounding the rods 56. As the shaft 55 is oscillated the bar 57 sweeps across the apertured portion of the wall 58 causing the flour to be fed through the apertures 49 onto the roller 26. The shaft 55 is oscillated continuously whenever the machine is operating to produce a ribbon of dough.

There is another container 60 and it has the same moving parts associated with it, to wit, the agitator and the shutter, and its adjusting means, except that the shutter is positioned in the reverse position to the shutter associated with the receptacle 48. This dusting device is adapted to dust flour onto the surface of the roller 27 and this flour will not come into contact with the dough until about the time the latter approaches the bight 31 of the two lower rollers.

As has been stated above, the two plates 34 forming the compression chamber at their lower edges do not touch the peripheries of the rollers 26, 27 and therefore the flour dusted upon these rollers will not be disturbed by these plates. The flour dusted on these rollers will not come into contact with the opposite faces of the body of dough until the dough travels below the lower ends of the plates 34. The dusting flour will therefore not be pushed back but will be pressed into opposite faces of the dough as the latter travels through the bight 31.

It is preferable to adjust the shutter of the left hand dusting receptacle 48 to expose more of the discharge apertures 49 than those exposed on the right hand receptacle 60 by its shutter in order that more flour per minute will be dusted upon the left hand roller 26 than is dusted upon the right hand roller 27. This relation will cause the ribbon of dough as it passes from the bight of the two rollers to immediately leave contact with the roller 26 because of the greater amount of flour dusted upon one surface of the ribbon; and to follow or remain in contact with the periphery of the right hand roller 27 because of the lesser amount of flour dusted upon this surface of the dough, in order that the ribbon of dough will have a natural tendency to follow only the roller 27 until it arrives at the scraping knife 45 and at the position over and close to the upper run of the belt 37. This adjustment may be so made that the scraping knife 43 will have little or no work to perform because the ribbon of dough through the difference in the dusting of the two rollers will follow the roller 27 rather than the roller 26.

The device for marking the dough to indicate the kind of filler in the pie is arranged to act upon the ribbon of dough at regular intervals where it is travelling upon the upper run of the belt 37 as it is continuously deposited there by the compression rollers. The marking device is constructed as follows:

There are two parallel shafts 61 mounted to reciprocate in apertures in cross members 62 of the frame of the machine, these shafts being shown as disposed over the path of the plate conveyor and beyond the ribbon forming mechanism. These shafts are connected at the right hand ends in Figure 7 by a cross bar 63 secured to the shafts by nuts 64 and with cushions 65 of rubber or other soft material surrounding the shafts and forming cushions between the bar 63 and one of the cross members 62 of the frame to serve as cushion stops for the shafts to limit their movement to the left in Figure 7.

There are long coiled springs 66 each having one end connected with one end of the cross bar 63 and with a stationary eye 67 near the left in Figure 7, these springs tending to move the shafts 61 to the left in Figure 7 with the cushions 65 resting against the frame member 62 but permitting the shafts to be moved to the right in Figure 7 against the tension of the springs.

The left hand ends of the shafts 61 in Figures 7 and 8 are connected by the cross bar 68 having hubs 69 surrounding and secured to the respective shafts, and one end of the flexible supporting member 70 is fixed to the center of this cross member 68. There is a plate 71 of non-flexible material or of such thickness as to be non-flexing and this is attached by screws 72 to one end of the flexible member 70. It extends to the left in Figures 7, 8, 9 and 11 and it has a cross head or member 73 at its left hand end to which the die for marking the dough is attached.

The die, shown at 74 is provided with marking members 75 of any particular shape, according to the indicia to be impressed upon the dough. For instance, these marking portions may be made to form conventional designs or letters indicating the kinds of filling in the pies, such as mince, apple, etc. Obviously, the die is made interchangeable so that different dies may be used from time to time, according to the different fillers in the pies made on the machine at different times.

The die is shown as formed not only with the marking members and with a flange 76 to engage the top surface of the dough, but also a body having grooves 77 along opposite sides to form a T shaped head which is adapted to slide into a pocket formed in a holding member 78 which is carried by the plate 73.

This die holding member 78 is connected with the plate 73 by the bolts 79, and coiled springs 80 surrounding these bolts lie between the top of the die carrying member 78 and the under side of the plate 73 and allow a relative up and down movement between the die carrying member and the plate.

There is a cross bar 81 having rollers 82 on opposite ends which roll along the top edges of the stationary tracks 83 which latter are supported on the cross members 62 of the frame. The plate 73 is provided with upwardly extending bolts 84 which pass through the bar 81 and extend some distance above the latter. Spiral springs 85 surround the bolts 84 one end of each spring abutting against a head 86 on the bolt and the other resting on the top of the bar 81. Through this construction the bar 81 having the rollers is adapted to travel along the tracks 83 and to partially support the plate 73 but in a manner which permits the latter to move vertically.

On the inner or opposed faces of the tracks 83 near the left hand end in Figures 7 and 8 I have provided parallel ribs 87 on each track and the cross plate 73 has reduced ends 88 which travel back and forth in the spaces between the two ribs 87. Between the upper and lower ribs I have attached to the face of each track a switching member 89 having an angular forward edge 90 and with these switching members the projections 88 of the cross head are adapted to engage while moving in one direction, for the purpose of depressing the printing block; and when the plate 73 moves in the reverse direction the reduced ends 88 engage the rear slanting edges 91 of the switch members.

The shafts 61 and with them the parts of the marking device are reciprocated in one direction or toward the right in Figures 7 and 8 by the movement of the conveyor, whereas the return movement or towards the left is caused by the spiral springs 66.

The conveyor has pintles 8 extending laterally therefrom at each hinge joint of the conveyor and these pintles are adapted to engage downwardly extending pins 92 which are mounted in the lower ends of the arms 93 which are attached to and movable with the shafts 61.

When the parts are in the position shown in Figure 8, the pintles 8 of the conveyor approach the pins 92 and when they engage therewith the movement of the conveyor causes the shafts 61 to move from left to right, as long as the pintles are engaged with the pins 92 and the shafts are reciprocated at the same speed as the travel of the conveyor, so that the actions are synchronized and the marking device travels in one direction at the same speed as the upper run of the belt 37 on which the ribbon of dough is first deposited.

There is a rocking member 94 pivoted on each of the arms 93 which rocking members are adapted to be tripped by the stationary stop members 95 attached to the frame of the machine, after the shafts and the marking device have moved to the right the extent of their intended stroke. There is a pin 96 projecting laterally from each tripping member 94 and this pin acts on a spring plunger 97 to lift the latter against the opposition of the spring 98 which is compressed between the collar 99 on the plunger and the stationary bracket 100 mounted on the arm 93.

Each plunger 97 is connected with one of the vertically movable pins 92 referred to above, so that when the rocking members 94 are tripped by engagement with the stationary stops 95 the pins 92 are lifted out of the path of the pintles 8 of the conveyor thereby disengaging the connection between the shafts 61 and the conveyor, whereupon the springs 66 cause a rapid return movement of the shafts and the marking device to the left or into the position shown in Figures 7 and 8.

As the pintles 8 are disposed at the meeting lines of successive sections of the conveyor, the shafts 61 and the marking device will be reciprocated to the right with each section of the conveyor, so that there will be a complete reciprocating movement of the marking device for each plate holder on the conveyor in order to effect the marking of each portion of the dough which is to be deposited upon a plate on the conveyor.

When the parts are in the position shown in Figures 7 to 11 inclusive, the reduced ends 88 of the plate 73 lie in advance or to the left of the switching members 89. As a pair of pintles 8 of the conveyor engage the pins 92 the shafts 61 and the marking device will begin to move from left to right in Figures 7 and 8 at the same speed as the conveyor. Near the beginning of this movement the ends 88 engage the slanting forward edges 90 of the switching members so that as the marking device continues to move to the right the ends 88 will be deflected by the switching member and this will cause the plate 73 to move downwardly against the resistance of the springs 85.

When the plate 73 moves downwardly, the printing die carrier also moves downwardly as it is attached thereto, and as the printing die is carried by the member 73 it will also move downwardly towards the upper run of the belt 37 and cause the lower or printing portion of the printing die to be pressed downwardly against the ribbon of dough, thereby impressing on the latter a letter or other indicia signifying the kind of filler in the pie. When the printing die is in contact with the ribbon of dough, it is moving from left to right at the same speed as the travel of the belt 37 so that the action of the printing die is to press downwardly on the dough while travelling therewith.

When the rocking members 94 engage the stop members 95 they are turned so that the pins 96 lift the plunger 97 against the resistance of the springs 98 and this action lifts the pins 92 out of engagement with the pintles 8 of the conveyor and immediately the spiral springs 66 cause a rapid return of the shafts 61 and the printing device from right to left to return them to the position shown in Figures 7 and 8. By the time the printing device has reached the extreme right hand limit of its movement and the rocking members are rocked by the stops 95 the reduced ends 88 of the plate 73 will have passed to the right of the switching members 89 in Figure 7 and as soon as this occurs the springs 85 which have been put under tension will lift the plate 73 into the path of the switching member.

As the marking device moves to the left under the action of the springs 66 the ends 88 will engage the rear slanting edges 91 of the switching members so that the switching member will serve to lift the ends 88, thus raising the plate 73 and as the printing die is carried thereby the latter is lifted from the dough and held out of contact therewith while the printing device is making its return stroke, the ends 88 of the plate 73 travel between the switching member and the upper rib 87 and the printing block is at that time held above the path of the dough.

When the printing device is moved the full distance to the left, the printing block will have been moved over the upper run of the belt 37 and the parts will have been restored to the starting position, ready for a succeeding operation.

The operation of the marking device is therefore as follows: The marking device is moved from left to right in synchronism with the conveyor and with the travel of the belt 37 by the movement imparted through the action of the pintles 8 on the pins 92 in opposition to the resistance of the springs 66.

During this movement the printing die is pressed downwardly into contact with the ribbon of dough on the belt 37 by the action of the switching member which presses the plate 73 downwardly, thus lowering the printing die against the dough. The printing die is moving from left to right while in contact with the dough at the same speed of movement as the dough itself, so that there is a clear impression made by the printing die upon the dough.

When the printing device has completed its stroke from left to right, the rocking members 94 are tripped by the stops 95, thus lifting the plungers 99 and the latter lift the pins 92 out of engagement with the pair of pintles 8 which have been causing the movement of the printing device. As soon as this disengagement takes place the shafts 61 and the printing device are rapidly reciprocated from right to left to return the printing device to its starting position. The printing die is lifted out of engagement with the dough when the ends 88 engage the rear slanting surfaces 91 of the switching member; and as these ends travel between the switching member and the upper rib 87 during this return movement, the printing die is held above the path of the ribbon of dough so that there is no engagement between the printing die and the dough during the return movement of the printing device.

These operations take place automatically and periodically in timed relation with the movement of the conveyor. The switching members 89 are pivotally mounted at their rear ends upon the screws 101 so that they may swing vertically from these pivots. Pins 102 are connected to the forward ends of the switching members and these pins extend through slots in the tracks 83 and outside of the tracks there are coiled springs 103 each having one end connected with a pin 102 and the other end connected with a stationary pin 104 mounted on the track.

The tendency of these springs is to lift the forward ends of the switching members so that the leading end 90 thereof will be in the path of the ends 88 of the plate 73 when the printing device commences to move from left to right.

After the printing device has made this movement and commences the return movement from right to left, the ends 88 travel up the rear inclined edges 91 of the switching members and as the ends move from right to left between the switching members and the upper ribs 87 the forward ends of the switching members are pressed downwardly by the ends 88 until they have passed the forward ends of the switching members. When this occurs, the forward ends of the switching members are rocked upwardly by the springs 103 so that the forward ends of the switching members will be in the path of the ends 88 when the printing device is ready to make another stroke from left to right. In this manner the switching device automatically lowers and raises the printing block so that it is in contact with the dough while moving in one direction and is held disengaged from it while moving in the opposite direction.

Power is applied to operate the various movable parts of the machine as follows: On the cross shaft 105 I have shown a sprocket 106 which is operated by the chain 107 from any source of power (not shown) and it may be a motor or any other source of power. On this shaft there is a bevel gear 108 which meshes with and drives a bevel gear 109 which is mounted on one end of an inclined shaft 110. On the other end of this shaft, as shown in Figure 1, there is fixed a worm 111 which meshes with and drives the worm gear 112 fixed to the shaft 6 which carries the sprocket wheel 5. Through the operation of the parts just described power is applied from the shaft 105 to the shaft 6 to drive the conveyor.

There is a sprocket wheel 113 on the shaft 105 and with it engages an endless chain 114 which extends to the left in Figure 1 and engages and drives a sprocket 115 fixed on a shaft 116. There is another shaft 117 mounted to the left of the shaft 116 and parallel therewith, and these two shafts have sprockets 118, 119 in line with each other and there is a guide pulley 120 mounted over the sprocket 118. The endless chain 121 engages around the sprocket 122 on the shaft 123 and it also passes under the pulley 120 partly around the sprocket 119, partly around the sprocket 118 on the shaft 116 and back to the sprocket 122. This chain not only conveys the operating force to the sprocket 122 which, being mounted on the shaft 123, causes the endless belt 37 to travel in synchronism with the conveyor, but the chain also causes the shaft 117 to revolve in synchronism with the shaft 116.

There is a sprocket 124 on the shaft 117 around which engages an endless chain 125 which chain also engages around the sprocket 126 which is mounted on the shaft 127 on the upper part of the machine. I have shown a pulley 128 for taking up slack in this chain. On the shaft 127 to which the sprocket 126 is connected there is a pinion 129 which meshes with and drives the gear 130 which is fixed to the shaft 29 on which the roller 27 is mounted. There is a gear 131 similar to the gear 130 and meshing with it, and it is attached to the shaft 28 on which the companion roller 26 is mounted.

Through the parts just described power is applied to the pair of rollers 26, 27 to revolve them in relatively reverse directions and at the same surface speed. I have shown two small pinions 132 mounted on shafts 133 and 134 meshing respectively with the gears 130 and 131 by which they are driven. These pinions also mesh with and drive the gears 135, 136 which are mounted on the shafts 21, 20 on which are also mounted the upper rollers 23, 22. The four dough rollers are thus operated in unison.

The upper rollers 23, 22, however, make a greater number of revolutions per minute than the lower rollers 26, 27 because of the difference in diameter of the upper and lower rollers. Preferably, the surface speed of the upper pair of rollers 23, 22 is slightly greater than the surface speed of the lower rollers 26, 27.

There is still another sprocket 137 mounted on the shaft 117 and the endless chain 138 travels around this sprocket and also around the sprocket 139 in the upper part of the machine which is mounted on the shaft 140. There is a crank pin 141 attached to this latter sprocket and a connecting rod 142 is pivotally connected at one end to the crank pin. The other end of the connecting rod is pivotally connected to a bell crank lever 143 mounted on the shaft 144 which is the shaft that carries the flour agitator in the left hand flour receptacle 48. To the other arm of the bell crank lever there is pivotally connected a pitman 145 and the other end of this pitman is pivotally connected to a lever arm 146 which is mounted on the shaft 147 which carries the flour agitator which is disposed in the right hand flour receptacle 60.

It will be apparent from what has been just described that the power transmitted from the shaft 117 revolves the sprocket wheel 139 and that the crank motion of the pin 141 is transmitted through the rod 142 to the bell crank 143 and from the bell crank to the pitman 145 to the lever arm 146 so that both agitating devices are oscillated back and forth to agitate the flour in the receptacles 48, 60 and to feed it through the apertures 49.

Operation

The operation of the machine has been partly described above.

Where the machine is used for applying both top and bottom crust dough a device for forming a ribbon of dough like that shown in Figures 1 to 4 placed to the left of the same in Figure 1 will have rolled a ribbon of dough and applied it to the plates travelling on the conveyor before the plates reach the dough rolling device shown in the drawings; and the fillers will also have been deposited upon the plates and the first sheet of dough so that by the time the plates arrive at the dough rolling device shown in the drawings they will be ready to receive the dough which is to form the top crust of the pie.

The dough rolling device shown and described herein will form a continuous strip or ribbon of dough by taking dough from the bottom of the hopper 17 by the action of the upper rollers 22, 23 and this dough will be propelled into the compression chamber 30. From there it is drawn by the lower rollers 26, 27 so that it passes through the bight 31 where it is formed with a uniform thickness suitable for the top pie crust. This ribbon of dough follows around the roller 27 to the edge of the scraping knife 45 so that the knife separates the ribbon of dough from the roller 27 and allows it to fall continuously upon the upper run of the belt 37 which is moving to the right in Figures 1 and 3.

While the dough is travelling with the upper run of the belt 37 the marking device periodically makes an impression upon the upper surface of the dough. As the dough travels with the belt 37 it leaves the belt while the latter travels around the pulley 39 moving down in a continuous ribbon onto the tops of the pie plates and covering the lower dough and the filler contained in the plates.

It will be understood that the dough is in a continuous ribbon at this time and that it is of sufficient width to cover the plates and to extend slightly beyond the same.

The plates are disposed close together on the conveyor so that there will be very little scrap produced when the dough is trimmed around the plates. Any known type of trimming device may be applied to the machine to trim the dough around the plates successively at some position to the right of the belt 37 in Figure 1.

As the agitators in the flour receptacles 48, 60 are oscillated in timed relation with the other parts of the machine, there will be a substantially uniform deposit of flour on the peripheries of the lower dough rollers, but as stated above, the shutter 50 of the receptacle 48 is preferably adjusted to leave open more of the holes 49 of the left hand receptacle than those exposed in the right hand receptacle in order that a larger portion of dusting flour will be deposited upon the left hand dough roller 26 than on the right hand roller, in order that as the ribbon of dough passes through the bight 31 it will have a natural tendency to follow the surface of the roller 27.

It will be apparent from what has been described above that the present machine supplies a continuous strip or ribbon of dough upon the pie plates and as the latter travel at a fixed speed in relation ot the formation and travel of the ribbon of dough, it is possible to form and to apply a ribbon of dough of uniform thickness upon the pie plates. If the width of the ribbon of dough is approximately or slightly greater than the diameter of the plates, there will be less scrap when the dough is trimmed than in the hand methods of pie making. While scrap is reused and is therefore not a total loss, nevertheless it is advantageous to reduce the proportion of scrap as much as possible and this is accomplished with the present machine. The entire operation of making pies is automatic in the present machine except the operation of supplying the fillers to the pie plates.

Having described my invention, what I claim is:

1. In a machine of the class described, means for forming a continuous ribbon of dough, including a hopper, a pair of co-operating rollers for propelling the dough from said hopper, a second pair of co-operating rollers to operate on the dough after it has been acted on by said first rollers, means forming a compression chamber between said first and second rollers, said means lying close to but out of contact with said second rollers, and means for dusting flour on both of said second mentioned rollers so that said flour does not come into contact with the dough until it arrives at or approximately at the bight of said second rollers so that said flour is applied to the dough before it passes through said bight.

2. In a machine of the class described, means for forming a continuous ribbon of dough, including a hopper, a pair of co-operating rollers for propelling the dough from said hopper, a second pair of co-operating rollers of relatively larger diameter than said first rollers and arranged to operate on the dough after it has been acted on by said first rollers, means forming a compression chamber between said first and second pairs of rollers, said means lying close to but out of contact with said second pair of rollers, and means for dusting flour on both of said second pair of rollers so that said flour does not come into contact with the dough until it arrives at or approximately at the bight of said second pair of rollers.

3. In a machine of the class described, means for forming a continuous ribbon of dough, including a hopper, a pair of co-operating rollers for propelling the dough from said hopper, a second pair of co-operating rollers of relatively larger diameter than said first pair of rollers and arranged to operate on the dough after it has been acted on by said first pair of rollers, means forming a compression chamber between said first and second pairs of rollers, said means lying close to but out of contact with said second pair of rollers, and means for dusting flour on both of said second pair of rollers, so that said flour does not come into contact with the dough until it arrives at or approximately at the bight of said second pair of rollers, and means for driving said first and second pairs of rollers at such ratio that the peripheral speed of said first pair of rollers is greater than the peripheral speed of said second mentioned pair of rollers.

4. In a machine of the class described, means for forming a continuous ribbon of dough, including a hopper, a pair of co-operating rollers for propelling the dough from said hopper, a second pair of co-operating rollers to operate on the dough after it has been acted on by said first pair of rollers, means forming a compression chamber between said first and second pairs of rollers, said means lying close to but out of contact with said second pair of rollers, means for dusting flour on both of said second mentioned rollers so that said flour does not come in contact with the dough until it arrives at or approximately at the bight of said second pair of rollers, and means for adjusting said dusting means whereby a relatively larger quantity of flour may be dusted on one of said second pair of rollers than on the other of said second pair of rollers.

5. In a machine of the class described, means for forming a continuous ribbon of dough, including a hopper, a pair of co-operating rollers for propelling the dough from said hopper, a second pair of co-operating rollers arranged to operate on the dough after it has been acted on by said first pair of rollers, said second pair of rollers mounted so that the bight between said rollers is narrower than the bight between said first pair of rollers, means forming a compression chamber between said first and second pairs of rollers, including end plates, and front and rear plates lying in divergent positions between the first and second pairs of rollers, said divergent plates terminating close to but out of contact with said second pair of rollers, and means for dusting flour on both of said second pair of rollers so that the flour on said rollers passes the lower edges of said divergent plates before coming into contact with opposite faces of the dough and the flour is applied to the dough before it passes through the bight of said second rollers.

6. In a machine of the class described, means for forming a ribbon of dough, a travelling belt on which the ribbon of dough is fed and means for marking the dough while travelling on said belt, including a reciprocating carrier, a marking member and means for resiliently supporting it on said carrier and a switching device operating to depress said marking member into contact with the dough while travelling with said belt and for raising said marking member out of contact with the dough during the return movement thereof.

7. In a machine of the class described, means for forming a ribbon of dough, a travelling belt on which the ribbon of dough is fed, a conveyor for conveying a plurality of receptacles at the same speed as the travel of said belt, and in position for the ribbon of dough to move from said belt onto the receptacles on said conveyor, and a device for marking the dough while travelling on said belt, including a reciprocating carrier, and a marking member carried thereby, and means on said conveyor for periodically reciprocating said carrier in timed relation with the movement of said belt.

8. In a machine of the class described, means for forming a ribbon of dough, a travelling belt on which the ribbon of dough is fed, a conveyor for conveying a plurality of receptacles at the same speed as the travel of said belt, and in position for the ribbon of dough to move from said belt onto the receptables on said conveyor, said conveyor including an endless, articulated means, a device for marking the dough while travelling on said belt, including a carrier and a marking member carried thereby, and means on said conveyor for periodically reciprocating said carrier in timed relation with the movement of said belt.

9. In a machine of the class described, means for forming a ribbon of dough, a travelling belt on which the ribbon of dough is fed, a conveyor for conveying a plurality of receptacles at the same speed as the travel of said belt, and in position for the ribbon of dough to move from said belt onto the receptacles on said conveyor, and a device for marking the dough while travelling on said belt, including a reciprocating carrier, a marking member carried thereby, means on said conveyor for periodically reciprocating said carrier in timed relation with the movement of said belt, and spring means for reciprocating said carrier in the direction opposite to that to which it is moved by said conveyor, and means for automatically releasing the engagement of said carrier and conveyor to permit the return of the carrier by said spring means.

10. In a machine of the class described, means for forming a ribbon of dough, a travelling belt on which the ribbon of dough is fed, a conveyor for conveying a plurality of receptacles at the same speed as the travel of said belt, and in position for the ribbon of dough to move from said belt onto the receptacles on said conveyor, and a device for marking the dough while travelling on said belt, including a reciprocating carrier and a marking member carried thereby, members carried by said carrier and operated by the members on the conveyor for moving the carrier in one direction, a tripping device for disengaging the members on the carrier from the members on the conveyor to permit the return of the carrier after being reciprocated in one direction by the conveyor, and means for operating said tripping member to permit return movement of said carrier.

11. In a machine of the class described, means for forming a ribbon of dough, a travelling belt on which the ribbon of dough is fed, a conveyor for conveying a plurality of receptacles at the same speed as the travel of said belt, and in position for the ribbon of dough to move from said belt onto the receptacles on said conveyor, and a device for marking the dough while travelling on said belt, including a reciprocating carrier and a marking member carried thereby, a pintle on said conveyor, a pin carried by the carrier and adapted to be projected into and out of the path of the pintle of the conveyor, a spring plunger for moving said pin out of the path of the pintle, a rocking, tripping member for operating said plunger in one direction, a stop co-operating to rock said tripping member in one direction to release the pin on the carrier from the pintle of the conveyor, said rocking member being adapted to be rocked in the opposite direction by said pintle to permit the latter to pass said rocking member.

12. A device for marking a travelling ribbon of dough, including a reciprocating carrier, a dough marking member and spring means for supporting the same on said carrier to permit up and down movement of the printing member, and an automatic switch arranged to cause the printing member to be moved downwardly into contact with the dough when said carrier is moving in one direction and to lift the marking member during movement of said carrier in the opposite direction, and means for reciprocating said carrier.

13. A device for marking a travelling ribbon of dough, including a reciprocating carrier, a dough marking member and spring means for supporting the same on said carrier to permit up and down movement of the printing member, and an automatic switch pivotally mounted adjacent one end thereof and arranged to cause the printing member to be moved downwardly into contact with the dough when said carrier is moving in one direction and to lift the marking member during the movement of said carrier in the opposite direction, and means for reciprocating said carrier.

14. A device for marking a travelling ribbon of dough, including a reciprocating carrier, a dough marking member and means for supporting the same on said carrier to permit up and down movement of the printing member, an automatic switch pivotally mounted adjacent one end, and spring means for normally raising the free end of said switch, means co-operating with said switch to cause the downward movement of the printing member when the carrier is moving in one direction, said co-operating means adapted to pass said switching member and to reengage the same on the opposite movement of said carrier so that said switching member holds the printing member upwardly out of contact with the dough during the return movement of the carrier, and means for reciprocating said carrier.

15. A device for marking a travelling ribbon of dough, including a reciprocating carrier, a resilient plate carried thereby, tracks, a supporting member movable along said tracks, resilient means for connecting said plate and said supporting member to permit up and down movement of said plate, a printing member carried by said plate, a switch automatically operating to depress said printing member while said carrier is moving in one direction and for automatically raising said printing member while said carrier is moving in the opposite direction, and means for reciprocating said carrier.

16. A device for marking a travelling ribbon of dough, including a reciprocating carrier, a resilient plate carried thereby, tracks, a supporting member movable along said tracks, resilient means for connecting said plate and said supporting member to permit up and down movement of said plate, a printing member and spring means for movably supporting it from said plate, a switch automatically operating to depress said printing member while said carrier is moving in one direction and for automatically raising said printing member while the carrier is moving in the opposite direction, and means for reciprocating said carrier.

17. A device for marking a travelling ribbon of dough, including a reciprocating carrier, said carrier including parallel, reciprocating shafts, a resilient member attached to said carrier, tracks, a supporting member movable along said tracks, means for connecting said resilient member and said supporting member to permit up and down movement of said resilient member, a printing member carried by said resilient member, a switch automatically operating to depress said printing member while said carrier is moving in one direction and for automatically raising said printing member while said carrier is moving in the opposite direction, and means for reciprocating said carrier.

18. In a machine of the class described, means for forming a continuous ribbon of dough including a hopper, a pair of cooperating rollers for propelling the dough from said hopper, a second pair of cooperating rollers beneath the first pair of rollers to operate on the dough after it has been acted on by said first rollers, means for dusting flour on both of said second rollers, and means for forming a compression chamber between said pairs of rollers adapted to receive the dough from the first pair of rollers and deliver the dough therefrom to the second pair of rollers, said compression chamber forming means comprising walls spanning the space between said first and second rollers and extending between and close to but out of contact with the second pair of rollers, said walls being sufficiently close to the second pair of rollers and having their lower ends sufficiently close to the bight thereof to form downwardly directed flour passages between the rollers and the lower ends of the walls, said passages serving to cause engagement of the flour with the dough only when the latter arrives at or approximately at the bight of the second pair of rollers so that the flour is applied to the dough before it passes through the bight of said second pair of rollers.

JOHN F. KOHLER.